US 011584419B2

(12) United States Patent
Kelling

(10) Patent No.: US 11,584,419 B2
(45) Date of Patent: Feb. 21, 2023

(54) SEPARABLE WHEEL PACK ASSEMBLY

(71) Applicant: Jeffrey Kelling, Wauwatosa, WI (US)

(72) Inventor: Jeffrey Kelling, Wauwatosa, WI (US)

( * ) Notice: Subject to any disclaimer, the term of this patent is extended or adjusted under 35 U.S.C. 154(b) by 268 days.

(21) Appl. No.: 16/706,145

(22) Filed: Dec. 6, 2019

(65) Prior Publication Data

US 2020/0180673 A1 Jun. 11, 2020

Related U.S. Application Data

(60) Provisional application No. 62/775,984, filed on Dec. 6, 2018.

(51) Int. Cl.
*B62B 5/06* (2006.01)
*B62B 1/10* (2006.01)

(52) U.S. Cl.
CPC ............... *B62B 5/068* (2013.01); *B62B 1/10* (2013.01)

(58) Field of Classification Search
CPC ......... B62B 5/068; B62B 5/0023; B62B 5/02; B62B 5/00; B62B 5/06; B62B 5/04; B62B 5/0438; B62B 1/10; B62B 1/12; B62B 1/00; B62B 1/08; B62B 1/18; B62B 1/183; B62B 1/186; B62B 1/20; B62B 1/208; B62B 1/24; B62B 3/008; B62B 3/00; B62B 3/08; B62B 3/12; B62B 3/02; B62B 3/022; B62B 2301/08; B62B 2301/20
See application file for complete search history.

(56) References Cited

U.S. PATENT DOCUMENTS

| | | | | |
|---|---|---|---|---|
| 2,401,986 A | * | 6/1946 | Talbott | B62B 5/0023 280/645 |
| 3,550,997 A | * | 12/1970 | Strand | B62B 5/0023 280/30 |
| 3,820,807 A | | 6/1974 | Curran | |
| 3,973,754 A | | 8/1976 | Chadwick, Jr. | |
| 4,045,040 A | | 8/1977 | Fails | |
| 4,171,139 A | * | 10/1979 | Cockram | B62B 1/20 280/47.3 |
| 4,664,395 A | | 5/1987 | McCoy | |
| 4,838,565 A | | 6/1989 | Douglas et al. | |
| 5,005,844 A | * | 4/1991 | Douglas | B62B 5/068 172/350 |

(Continued)

FOREIGN PATENT DOCUMENTS

| | | |
|---|---|---|
| DE | 102014012750 A1 | 3/2016 |
| EP | 2679467 A2 | 1/2014 |
| WO | 9939960 | 8/1999 |

OTHER PUBLICATIONS

International Search Report and Written Opinion from PCT/US2019/65032, dated Jun. 3, 2020.

*Primary Examiner* — James M Dolak
(74) *Attorney, Agent, or Firm* — Boyle Fredrickson, S.C.

(57) ABSTRACT

A wheel pack assembly includes a pack portion wearable by a user and a wheeled portion removably coupled to the pack portion. The pack portion includes a support frame coupled to a rear surface thereof. The support frame includes articulating arms and stabilizing elements. The wheel portion includes a frame and a first wheel set coupled to the frame and disposed at a location spaced apart from a rear end of the wheeled portion. The frame includes a first portion and a second portion that are joined together at a bend and such that the second portion defines a transport bed of the assembly.

8 Claims, 13 Drawing Sheets

(56) References Cited

U.S. PATENT DOCUMENTS

| | | | | |
|---|---|---|---|---|
| 5,215,355 | A * | 6/1993 | Klumpjan | B62B 1/24 298/5 |
| 5,385,355 | A | 1/1995 | Hoffman | |
| 5,769,431 | A * | 6/1998 | Cordova | B62D 51/04 280/47.131 |
| 5,810,378 | A * | 9/1998 | Brinkley | B62K 27/02 280/204 |
| 6,131,917 | A | 10/2000 | Walsh | |
| 6,139,033 | A | 10/2000 | Western | |
| 6,260,864 | B1 * | 7/2001 | Smith | B62B 1/04 280/63 |
| 6,341,787 | B1 * | 1/2002 | Mason | B62B 1/18 280/47.26 |
| 6,361,063 | B1 | 3/2002 | Daeschner | |
| 6,467,559 | B1 * | 10/2002 | Farrell | B62D 51/06 180/186 |
| 6,561,529 | B2 | 5/2003 | Darling, III | B62B 1/002 280/79.2 |
| 6,935,643 | B1 | 8/2005 | Purpuro | |
| 7,172,207 | B2 * | 2/2007 | Henry | B60D 1/00 280/40 |
| 7,322,584 | B1 | 1/2008 | Parker | |
| 7,422,223 | B1 * | 9/2008 | Silliman | B62B 5/068 280/190 |
| 7,484,737 | B2 | 2/2009 | Satorius | |
| 7,549,648 | B2 * | 6/2009 | Girard | B62B 1/208 224/184 |
| 7,600,764 | B1 * | 10/2009 | Parker | B62B 5/068 280/416 |
| 7,770,913 | B2 * | 8/2010 | Cannon | B62B 1/12 280/656 |
| 7,967,325 | B1 | 6/2011 | Burton et al. | |
| 8,141,887 | B1 * | 3/2012 | Poteat | B62B 1/12 280/47.24 |
| 8,267,409 | B2 * | 9/2012 | Gross | B62B 5/0026 280/1.5 |
| 8,366,125 | B2 * | 2/2013 | Loomans | B62B 3/009 280/47.17 |
| 8,672,202 | B2 | 3/2014 | Tayar | |
| 8,733,766 | B2 * | 5/2014 | Nieman | A45C 13/385 280/47.17 |
| 8,789,730 | B2 | 7/2014 | Mroczka | |
| 8,893,937 | B1 | 11/2014 | Bristol | |
| 9,185,952 | B1 * | 11/2015 | Turney | A45C 13/385 |
| 9,364,060 | B2 | 6/2016 | Bristol | |
| 9,365,224 | B1 * | 6/2016 | Koshutin | B62B 5/068 |
| 9,434,401 | B2 * | 9/2016 | Johnson | B62B 7/02 |
| 10,112,638 | B2 * | 10/2018 | Morse | A45F 3/14 |
| 11,198,459 | B1 * | 12/2021 | Dudley | B62B 1/12 |
| 11,254,341 | B2 * | 2/2022 | Carlson | B62B 3/02 |
| 11,400,965 | B2 * | 8/2022 | Panigot | B62B 1/12 |
| 11,414,116 | B1 * | 8/2022 | Wong | B62B 5/0006 |
| 2006/0273554 | A1 | 12/2006 | Henry | |
| 2007/0075105 | A1 | 4/2007 | Petrin | |
| 2007/0290460 | A1 | 12/2007 | Girard et al. | |
| 2012/0067932 | A1 | 3/2012 | Tayar | |
| 2013/0300072 | A1 | 11/2013 | Piaget et al. | |
| 2014/0203529 | A1 | 7/2014 | Ortega | |
| 2016/0229438 | A1 | 8/2016 | Morse | |

\* cited by examiner

SEPARABLE WHEEL PACK ASSEMBLY

CROSS REFERENCE TO RELATED APPLICATIONS

This application claims priority to U.S. Provisional Patent Application Ser. No. 62/775,984 filed on Dec. 6, 2018 titled "Separable Wheel Pack Assembly" and the disclosure of which is incorporated herein.

BACKGROUND OF THE INVENTION

1. Field of the Invention

The present invention relates to a wheel pack assembly, and, in particular, a wheel pack assembly including a pack portion being removably attached to a wheeled portion

2. Discussion of the Related Art

Hunters, hikers, foot soldiers, and rescue workers routinely traverse through the woods and over rough terrain while carrying gear, game, or other loads. Such loads usually require the assistance of equipment to assist in carrying the loads for long ranges and over a long period of time without exhausting the user. Known pack assembly solutions are rigid structures that do not compensate or adjust to the rough terrain usually encountered through such environments. As such, the user is subjected to every bump and bounce of the rough terrain, which can lead to premature exhaustion of the user over time. In addition, when traversing rough terrain through the woods, a user may need to maneuver or turn around in tight spaces.

As a result, there is a need in the art for a wheel pack assembly that reduces the stresses on the user to limit fatigue while the user carries a load over rough terrain and/or over longer distances. In addition, there is need in the art for a wheel pack assembly having stabilizing elements that compensate for the rough terrain in order to ease the stresses on the user as the load is carried over rough terrain for a period of time.

Further still, there is a need in the art for a wheel pack assembly having a carrier that is easily detachable from the pack. By allowing the carrier to easily detach from the pack, the maneuverability of the user and the carrier can be improved. In addition, when not traveling, the carrier can be easily detached from the pack and set on the ground to completely relieve the user of the load without having to remove the pack. Such considerations further improve the ease with the user may subsequently reassociate the pack and the carrier for operative association with one another when use of the assembly is desired.

SUMMARY OF THE INVENTION

The present invention discloses a wheel pack assembly including a pack portion being removably attached to a wheeled portion.

In accordance with one aspect of the application, a wheel pack assembly includes a pack portion that is wearable by a user and a wheeled portion that is removably coupled to the pack portion. The pack portion includes a support frame coupled to a rear surface thereof. Further, the support frame includes articulating arms and stabilizing elements. The wheel portion includes a frame and a first wheel set coupled to the frame and disposed at a location spaced apart from a rear end of the wheeled portion. The frame includes a first portion and a second portion that are joined at a bend and/or flexible joint. Further, in a preferred embodiment, the second portion includes a bed that is configured to provide a support for game or gear intended to be transported by user energy or power.

According to another aspect of the invention, the pack portion includes a hitch coupled to the support frame and the wheeled portion includes a coupler at a forward end of the wheeled portion. The hitch and the coupler are configured to interfit. The coupler may include a locking mechanism. The locking mechanism is configured to transition between a locked position and an unlocked position. When the locking mechanism is in the locked position, the hitch is not removable from the coupler. Conversely, when the locking mechanism is in the unlocked position, the hitch is removable from the coupler.

According to yet another aspect of the invention, the articulating arms of the support frame allow the hitch to transition in response to movement of the wheeled portion. Further, the stabilizing elements of the support frame are configured to maintain the hitch in a neutral position. In yet other embodiments of the invention, the wheeled portion may include a second set of wheels disposed forward of the first set of wheels. Additionally, the wheeled portion may include a third set of wheels disposed rearward of the first set of wheels.

According to another aspect of the invention, the wheeled portion may include handlebars extending from an angled portion of the frame. At least one of the handlebars may include a lever. Further, each handlebar may include a dipped portion extending downward from the handlebar.

In accordance with another aspect of the invention, a wheel pack assembly includes a pack portion that is wearable by a user and a wheeled portion removably coupled to the pack portion. The pack portion includes a support frame having at least one articulating arm, at least one stabilizing element, and a first interfit element. The wheeled portion includes a frame having a first frame portion and a second frame portion, a second interfit element coupled to frame and configured to removably couple with the first interfit element, and a first wheel or wheel set that is coupled to the frame and disposed at a location spaced apart from a rear end of the wheeled portion.

According to another aspect of the invention, the articulating arms of the support frame allow the first interfit element to transition in response to movement of the wheeled portion. Meanwhile, the stabilizing elements of the support frame are configured to preferably maintain the hitch in a neutral position. Further, the first interfit element includes a locking mechanism having a locked position and an unlocked position. The first and second interfit elements are removable from each other in the unlocked position, and the first and second interfit elements are not removably from each other in the locked position.

According to another aspect of the invention, the first portion of the frame of the wheeled portion includes a first leg extending forward from the bend and a second leg extending rearward from the bend. Similarly, the second portion of the frame of the wheeled portion includes a first leg extending forward from the bend and a second leg extending rearward from the bend. The first portion of the frame is pivotably coupled to the second portion of the frame at the bend about a pivot axis. The first and second portions of the frame pivot with respect to each other about the pivot axis to transition the wheeled portion between an operation orientation and a storage orientation.

According to yet another aspect of the invention, in the operation orientation, the first leg of the first portion of the frame extends from the pivot axis upward and forward at an angle, the second leg of the first portion of the frame extends from the pivot axis rearward, the first leg of the second portion of the frame extends from the pivot axis forward, and the second leg of the second portion of the frame extends from the pivot axis upward and rearward at an angle. Conversely, in the storage orientation, the first leg of the first portion of the frame and the first leg of the second portion of the frame are oriented along the same plane and the second leg of the first portion of the frame and the second leg of the second portion of the frame are oriented along the same plane.

According to another aspect of the invention, the wheeled portion may also include handlebars disposed at a distal end of the first leg of the second portion of the frame such that the same are oriented proximate and available for use by the user during use of the pack system. In addition, a bed is disposed along a length of the second leg of the second portion of the frame. Further yet, the wheeled portion may include a strap extending from the first leg of the first portion of the frame to the second leg of the second portion of the frame.

According to yet another aspect of the invention, the primary wheel set is coupled to the second leg of the first portion of the frame. In addition, a secondary wheel set may be disposed forward of the primary wheel set, while a tertiary wheel set may be disposed rearward of the primary wheel set.

These and other aspects, objects, and features of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE FIGURES

A clear conception of the advantages and features constituting the present invention will become more readily apparent by referring to the exemplary, and therefore non-limiting, embodiments illustrated in the drawings accompanying and forming a part of this specification, wherein like reference numerals designate the same elements in the several views.

In the drawings.

DETAILED DESCRIPTION OF THE FIGURES

The present invention and the various features and advantageous details thereof are explained more fully with reference to the non-limiting embodiments described in detail in the following description.

Figure 1:
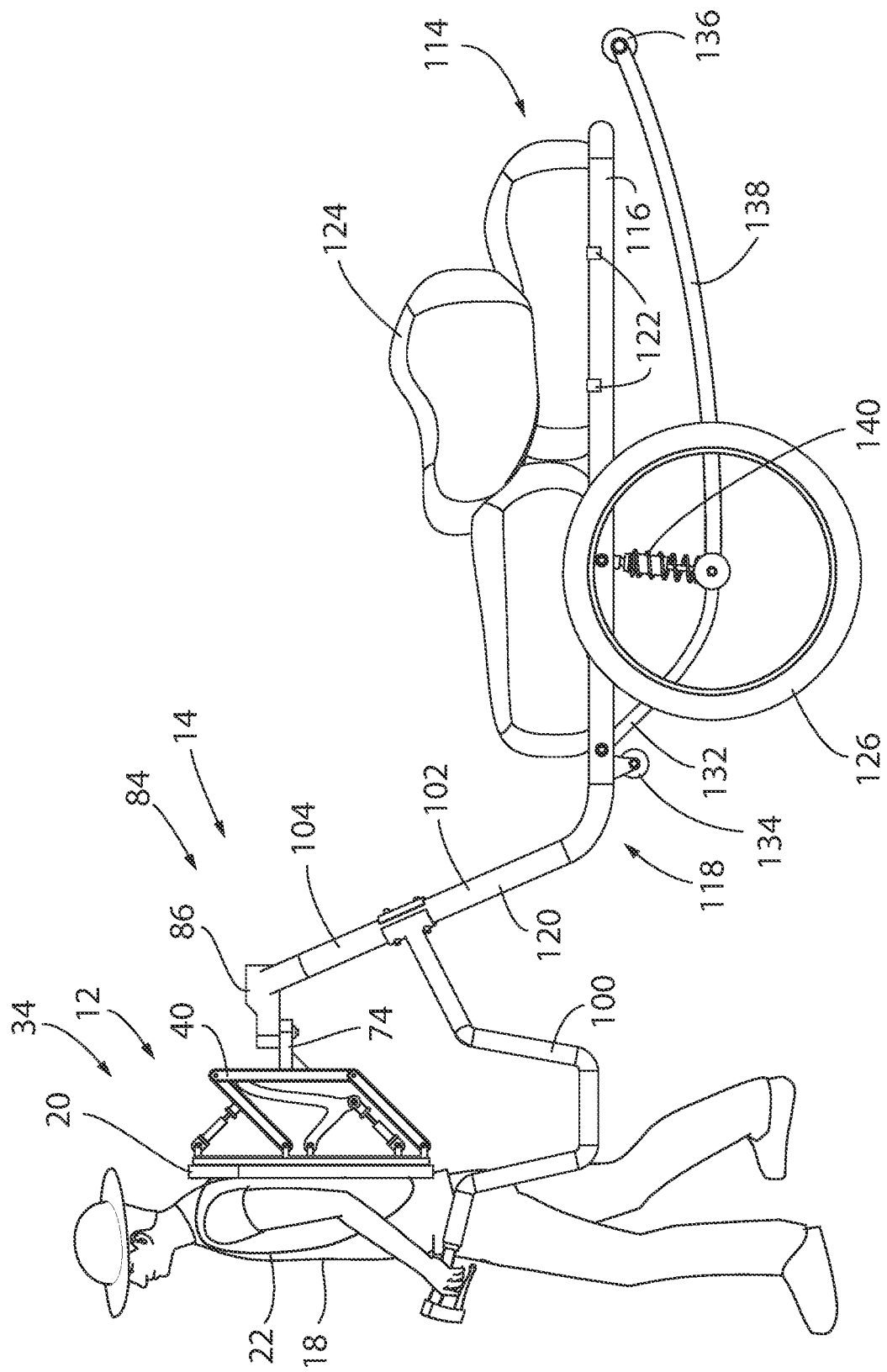
FIG. 1 is a side elevation view of a user wearing a wheel pack assembly according to the present application.
Figure 2:
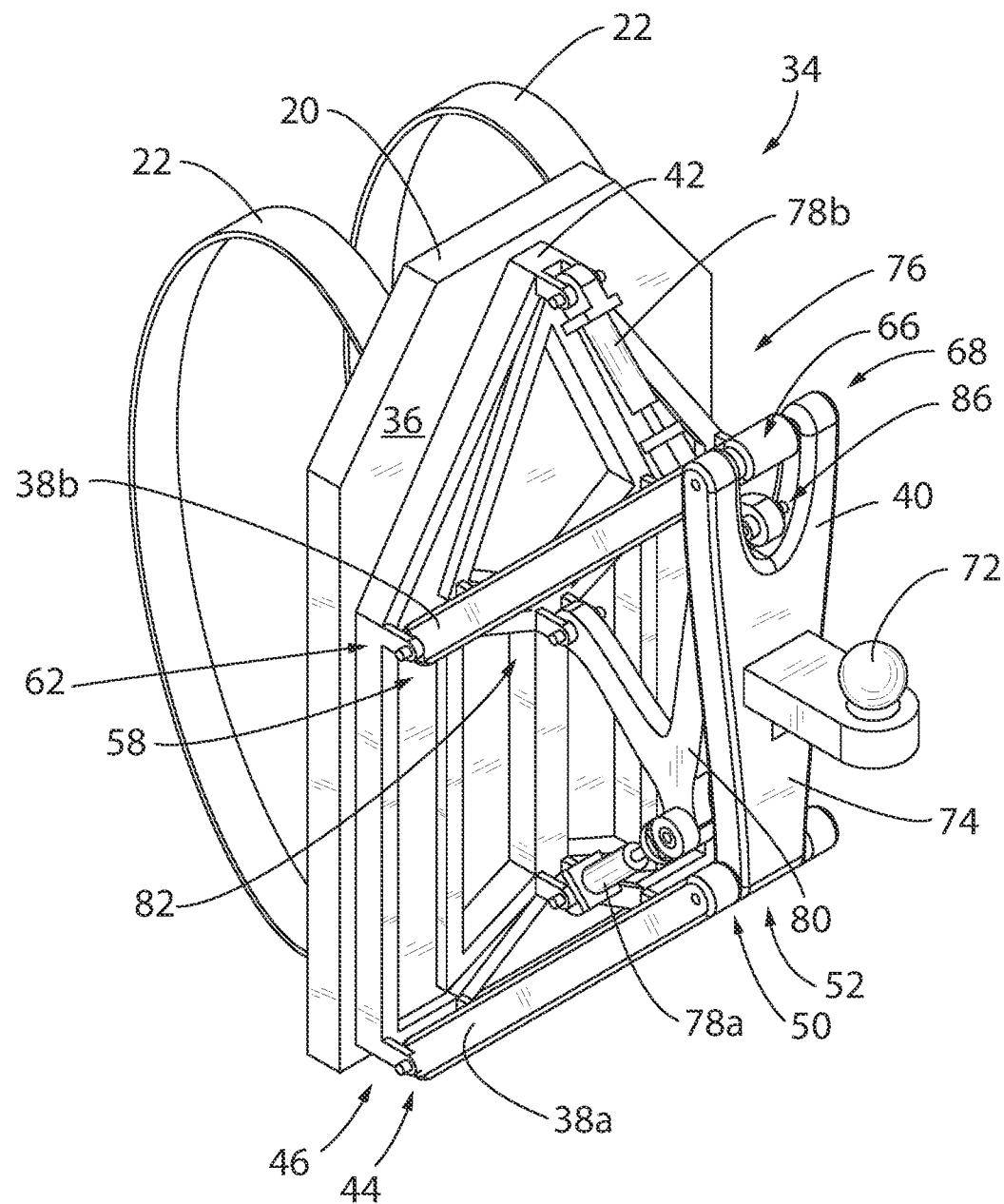
FIG. 2 is a rearward facing perspective view of a pack portion of the wheel pack assembly of FIG. 1 with the wheeled portion removed therefrom.
Figure 3:
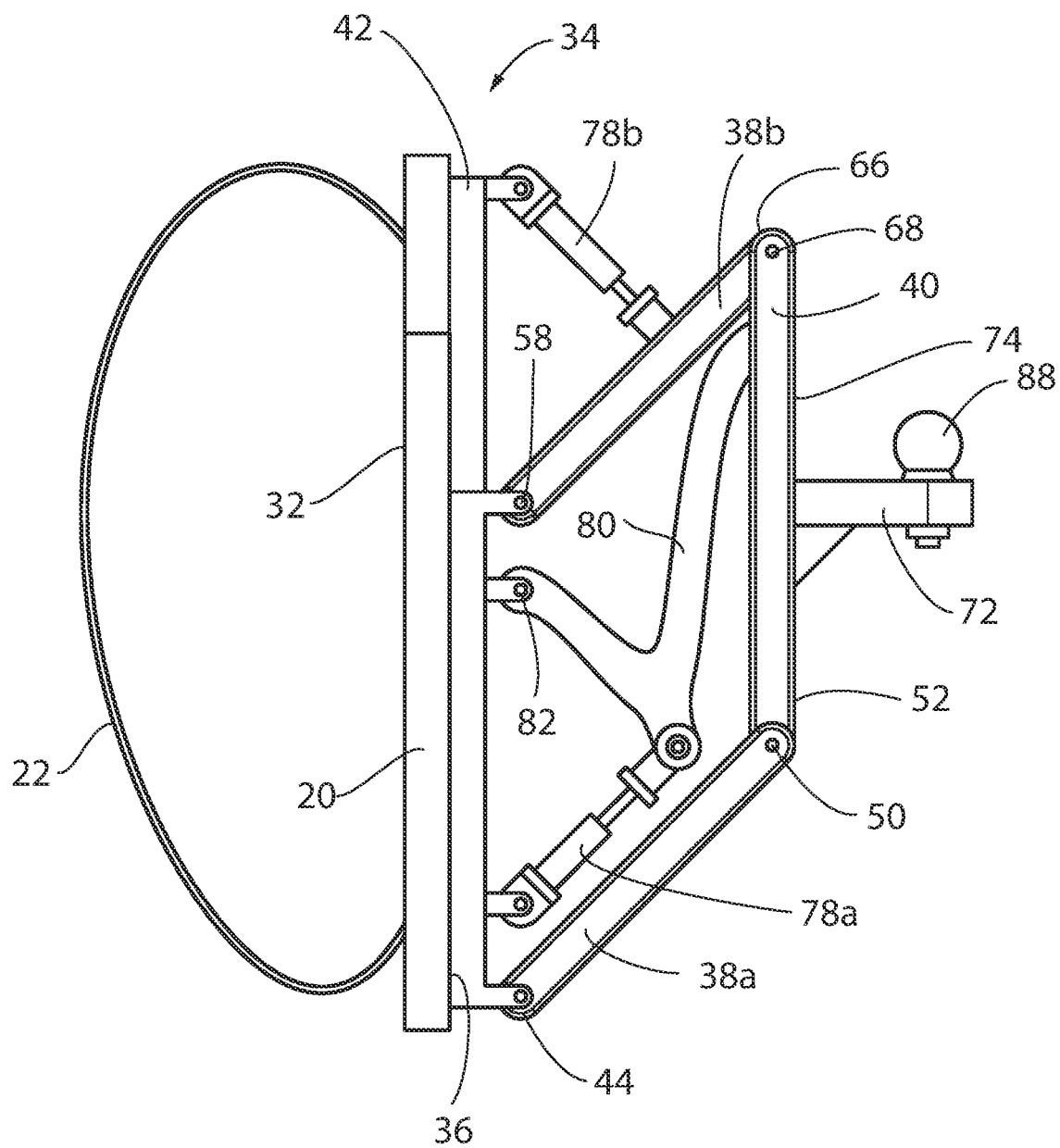
FIG. 3 is a side elevation view of the pack portion of FIG. 2.
Figure 4:
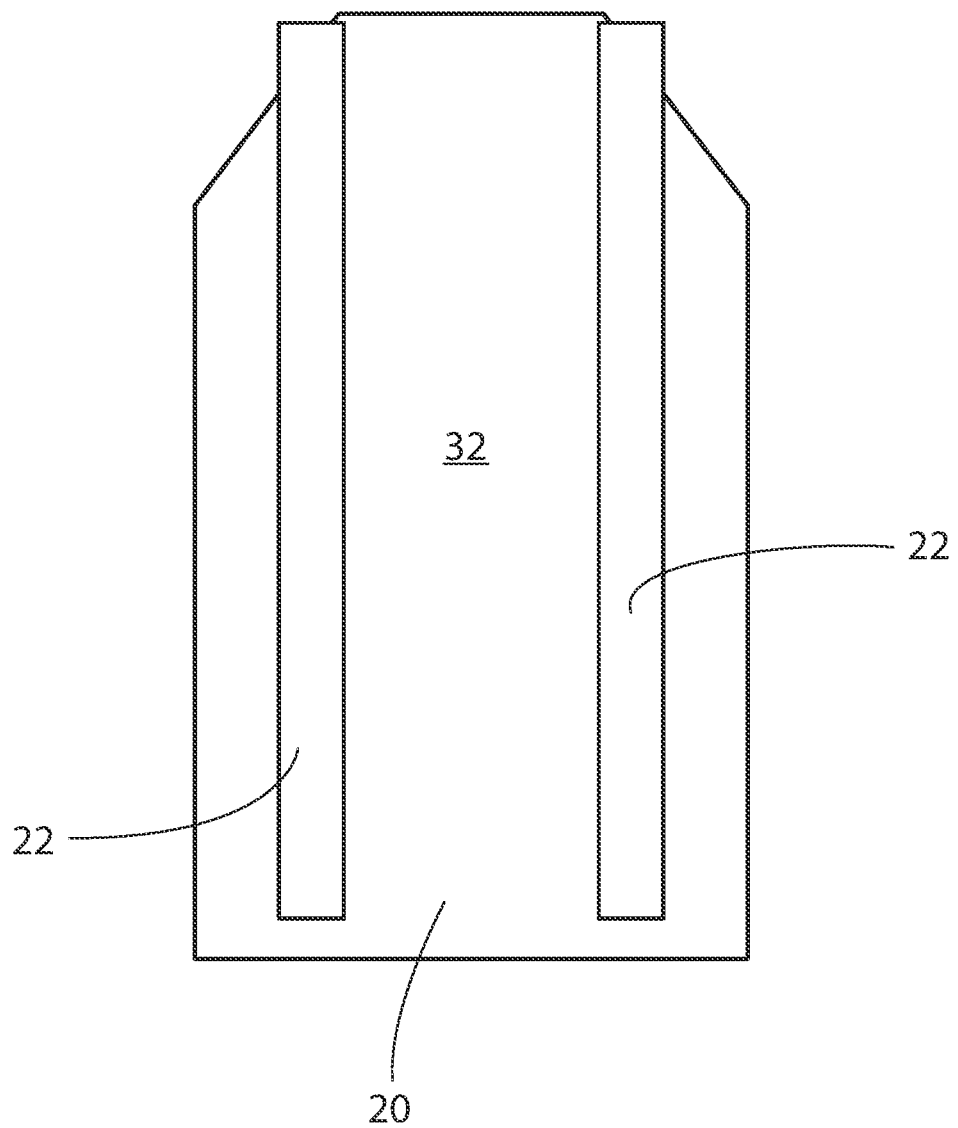
FIG. 4 is a front view, or forward or user facing view, of the pack portion of FIG. 2.

FIG. 1 depicts a side elevation view of a wheel pack assembly 10 according to the present invention. The wheel pack assembly 10 includes a pack portion 12 and a wheeled portion 14 that are removably coupled with each other by way of a ball and hitch connection 16. The wheel portion 14 will be further described with respect to FIGS. 6-10. The pack portion 12 of the wheel pack assembly 10 is configured to be worn by a user 18 and will be described in further detail below.

FIGS. 2-5 depict respective perspective, front, rear, side, top, and bottom side views of the pack portion 12 of the wheel pack assembly 10, according to an embodiment of the invention. The pack portion 12 includes a main body 20 that acts as a back support for the pack portion 12. In use, i.e. when a wearer or user 18 wears the pack portion 12, back support 20 is placed in contact with the back of user 18. At least one strap 22 is coupled to the back support 20. Similar to a backpack, each strap 22 includes a first end 24 coupled to an upper portion 26 of the back support 20 and a second end 28 coupled to a lower portion 28 of the back support 20. Each strap 22 is then spaced apart from the back support 20 to create an opening 30 configured to receive a respective arm and subsequently shoulder area of the user 18.

While the straps 22 are coupled to a front surface 32 of the back support 20, a support frame 34 is coupled to a rear surface 36 of the back support 20. The support frame 34 includes a number of articulating arms 38 extending from the back support 20 to a hitch plate 40. The support frame 34 may also include a pack frame 42 coupled to and oriented along the rear surface 36 of the back support 20. Each articulating arm 38 includes a first end 44 rotatably connected to the pack frame 42 and a second end 46 rotatably connected to the hitch plate 40.

Figure 5:
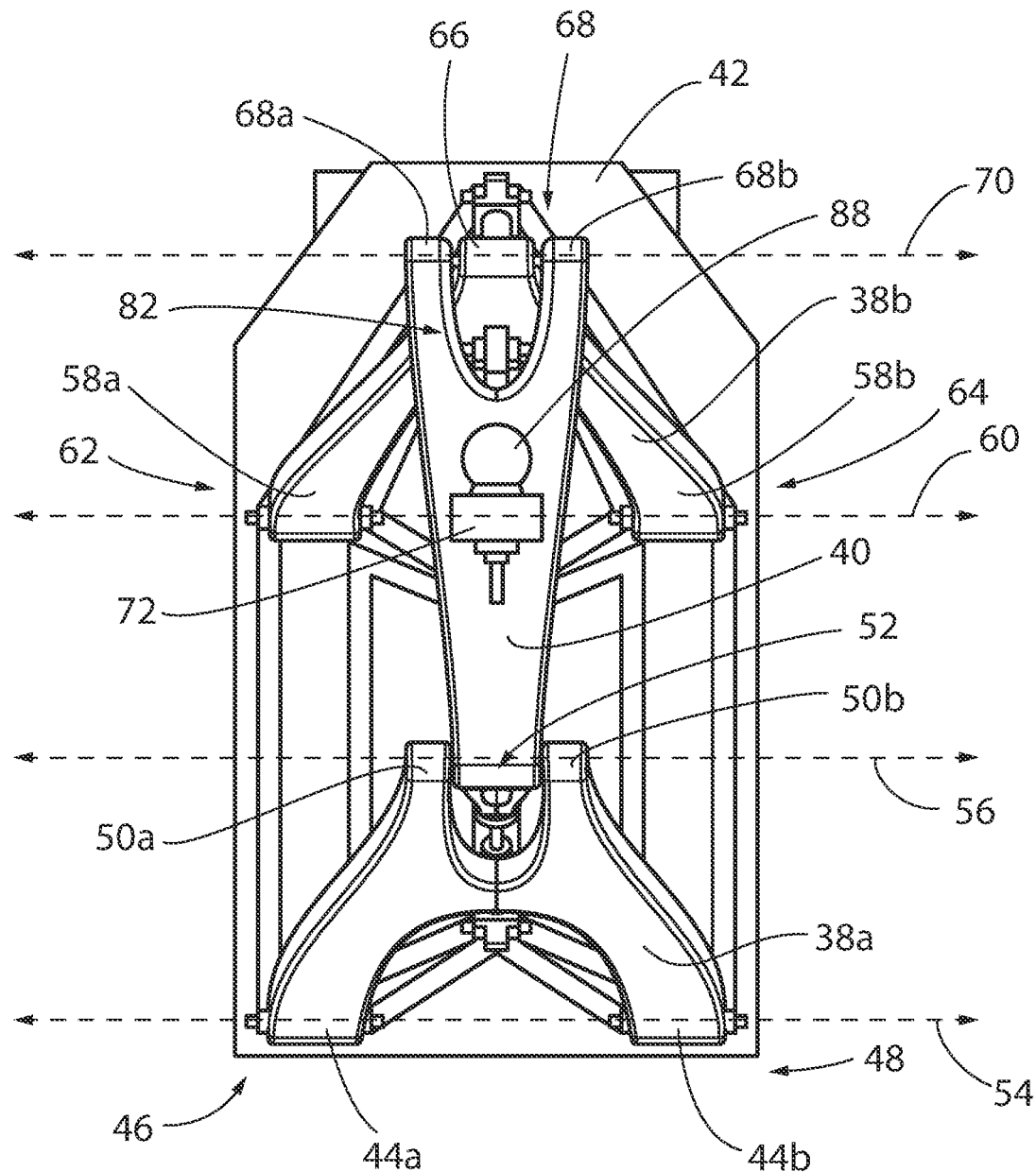
FIG. 5 is a rear elevation view of the pack portion of FIG. 2.

In the representative embodiment of the invention, the support frame 34 includes two (2) articulating arms 38. The lower articulating arm 38a includes a left first end 44a and a right first end 44b. The left first end 44a is coupled to the pack frame 42 at a lower left corner 46 of the pack frame 42, while the right first end 44b is coupled to the pack frame 42 at a lower right corner 48 of the pack frame 42. A left second end 50a is coupled to a lower end 52 of the hitch plate 40, and a right second end 50b is also coupled to the lower end 52 of the hitch plate 40. As shown in FIG. 5, the left and right first ends 44a, 44b of the lower articulating arm 38 are oriented along the same horizontal axis 54, which allows the lower articulating arm 38 to rotate about the horizontal axis 54. In addition, the left and right second ends 50a, 50b are oriented along the same horizontal axis 56, which allows the lower articulating arm 38a to also rotate about the horizontal axis 56. In turn, the lower articulating arm 38a and the hitch plate 40 are able to both rotate about the horizontal axis 56, while remaining coupled to each other.

Similarly, the upper articulating arm 38b includes a left first end 58a and a right first end 58b aligned with each other along a horizontal axis 60. The left first end 58a is coupled to the pack frame 42 at a left side location 62 of the pack frame 42, while the right first end 58b is coupled to the pack frame 42 at a right side location 64 of the pack frame 42. As stated above, the left and right first ends 58a, 58b of the upper articulating arm 38b are oriented along the same horizontal axis 60 to allow rotation of the upper articulating arm 38b about the horizontal axis 60. The upper articulating arm 38b also includes a second end 66 coupled to an upper end 68 of the hitch plate 40. In the representative embodiment of the invention, the upper end 68 of the hitch plate 40 includes a left upper end 58b and a right upper end 68b. The second end 66 of the upper articulating arm 38b and the upper end 68 of the hitch plate 40 are aligned with each other along a horizontal axis 70, which allows the upper articulating arm 38b and hitch plate 40 to rotate about the horizontal axis 70, while remaining coupled to each other.

While the representative embodiment of the invention depicts the lower articulating arm 38a having respective left and right first ends 44a, 44b and respective left and right second ends 50a, 50b, other embodiments of the invention may include any number of first and second ends 44, 50. Similarly, varying embodiments of the invention may have the upper articulating arm 38b with any number of first or second ends 58, 68. Further yet, the hitch plate 40 of varying embodiments of the invention may include any number of upper and lower ends 68, 52.

As shown in FIGS. 1-5, a hitch 72 extends from an outer surface 74 of the hitch plate 40. In some instances, the hitch 72 may be cantilevered from the hitch plate 40. The arrangement of horizontal axes 54, 56, 60, 70 described above, allows for the hitch 72, to move in the vertical and horizontal planes in response to the terrain intended to be traversed by the pack assembly 10 and user 18. The pack portion 12 may further include a stabilizing assembly 76 to maintain the hitch 72 in a neutral position when no forces are exerted on the support frame 34. The stabilizing assembly 76 includes at least one stabilizing element 78, such as, but not limited to, a shock absorber or spring, and at least one stabilizing arm 80. In the representative embodiment of the invention, the stabilizing assembly 76 includes a first stabilizing element 78a, a second stabilizing element 78b, and a stabilizing arm 80. The stabilizing arm 80 extends from the pack frame 42 to the hitch plate 40. The first stabilizing arm 78a extends from the pack frame 42 to a location 82 of the stabilizing arm 80 spaced apart from the pack frame 42. While the stabilizing arm 80 is depicted as having a v-shaped geometry, other embodiments of the invention may include any shaped stabilizing arm 80. In addition, the second stabilizing element 78b extends from the pack frame 42 to the upper articulating arm 38b. As stated above, the stabilizing elements 78a, 78b work in conjunction with the articulating arms 38 to maintain the hitch 72 in a neutral position and stabilize the hitch 72 during operation of the pack assembly 10.

In other embodiments of the invention, the first stabilizing element 78a may be coupled to the lower articulating arm 38a and the second stabilizing element 78b may be coupled to the stabilizing arm 80. While the representative embodiment of the invention depicts the stabilizing arm 80 as being coupled to the hitch plate 40 at a location 82 below the upper end 68 of the hitch plate 40, it is contemplated that the stabilizing arm 80 may be coupled to the hitch plate 40 at any location at or between the upper and lower ends 68, 52 of the hitch plate 40. In yet other embodiments of the invention, the stabilizing system 76 may include one or more stabilizing elements 78 without the inclusion of a stabilizing arm 80. In such instances, each stabilizing element 78 would extend from the pack frame 42 to an articulating arm 38.

Figure 8:
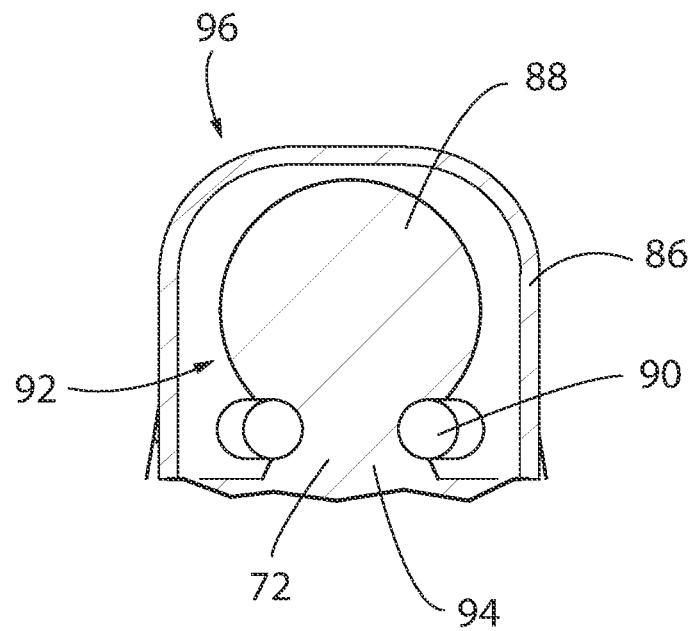
FIG. 8 is a cross-sectional view of a ball and hitch connection of the wheel pack assembly in a closed position.
Figure 9:
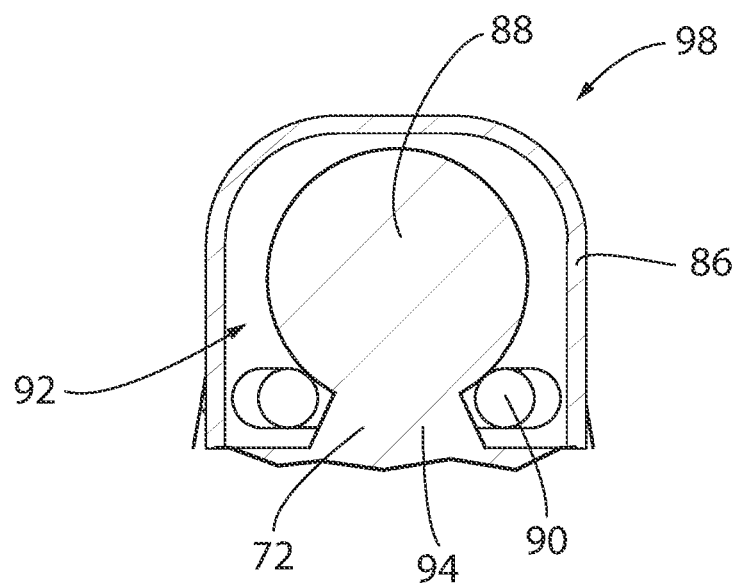
FIG. 9 is a cross-sectional view of the ball and hitch connection of the wheel pack assembly in an open position.
Figure 10:
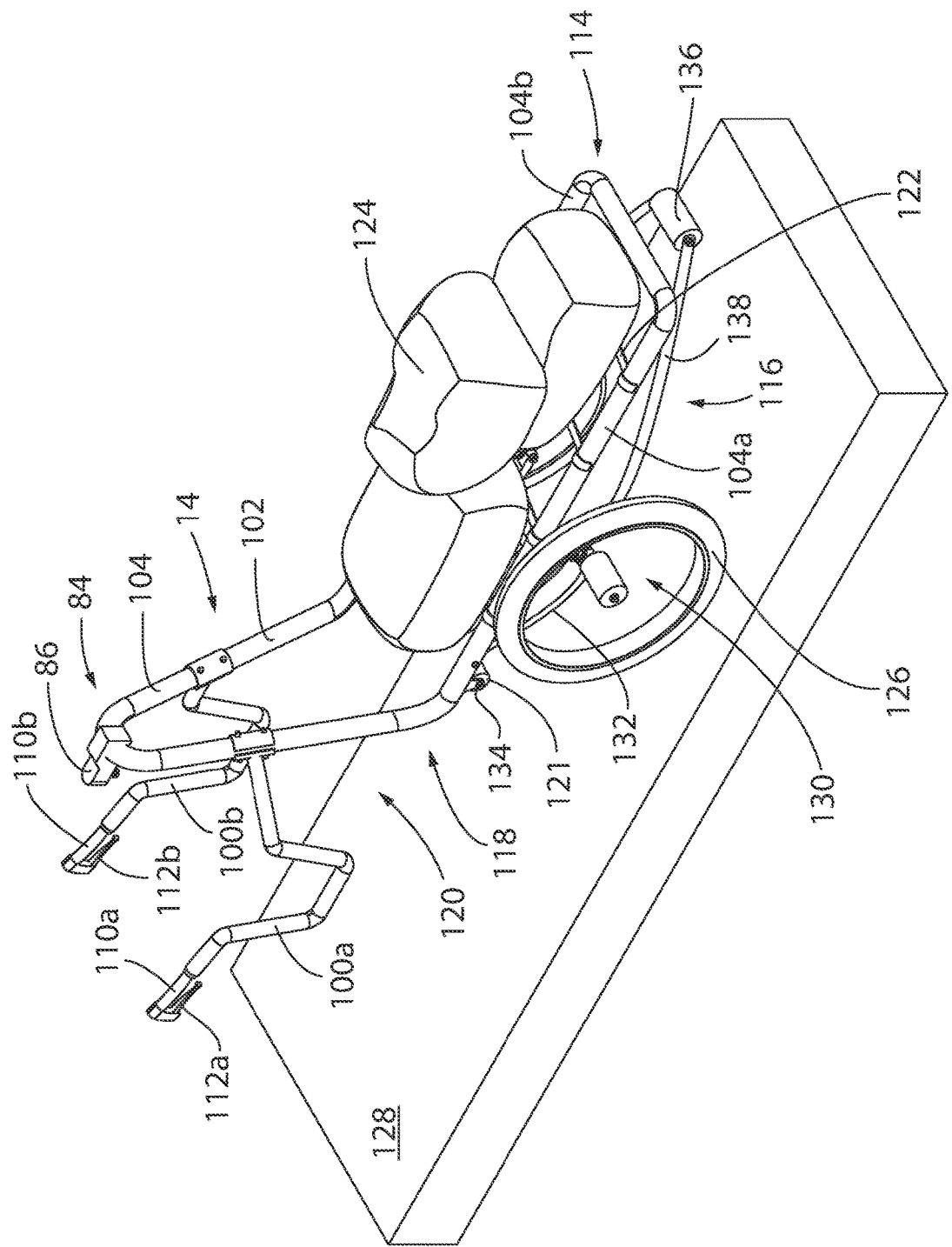
FIG. 10 is a perspective view from a rearward orientation of the wheeled portion of the wheel pack assembly and associated with a ground surface.

Referring now to FIGS. 9 and 10, the pack portion 12 is shown attached to a forward end 84 of the wheeled portion 14. The forward end 84 of the wheeled portion 14 includes a coupler 86 configured to receive the ball 88 of the hitch 72. The coupler 86 and hitch 72 are configured to interfit with each other to removably couple the pack portion 12 to the wheeled portion 14. FIGS. 8 and 9 further depict the interfit of the hitch 72 and the coupler 86. In the representative embodiment of the invention, the coupler 86 may include a locking mechanism 90 disposed within an interior 92 of the coupler 86. The locking mechanism 90 is configured to at least partially surround a neck 94 of the hitch 72, which has a smaller diameter than that of the ball 88 of the hitch 72. The locking mechanism 90 transitions between a locked position 96 (FIG. 8) and an unlocked position 98 (FIG. 9). In the locked position 96, the locking mechanism 90 is brought adjacent the neck 94 of the hitch 72 and sized to be smaller than the diameter of the ball 88 of the hitch 72. As a result, the locking mechanism 90 prevents disengagement between the ball 88 and coupler 86 when in the locked position 96. It should be appreciated that, when locked or unlocked, the cooperation between ball 88 and couple 86 is configured to allow relative rotation therebetween. Conversely, in the unlocked position 98, the locking mechanism 90 is spaced apart from the neck 94 of the hitch and sized to be larger than the diameter of the ball 88 of the hitch 72. When unlocked, hitch 72 may be disengaged from ball 88 via relative vertical translation therebetween. As a result, the coupler 86 and ball 88 are easily separated from each other when the locking mechanism 90 is in the unlocked position 98.

Figure 6:
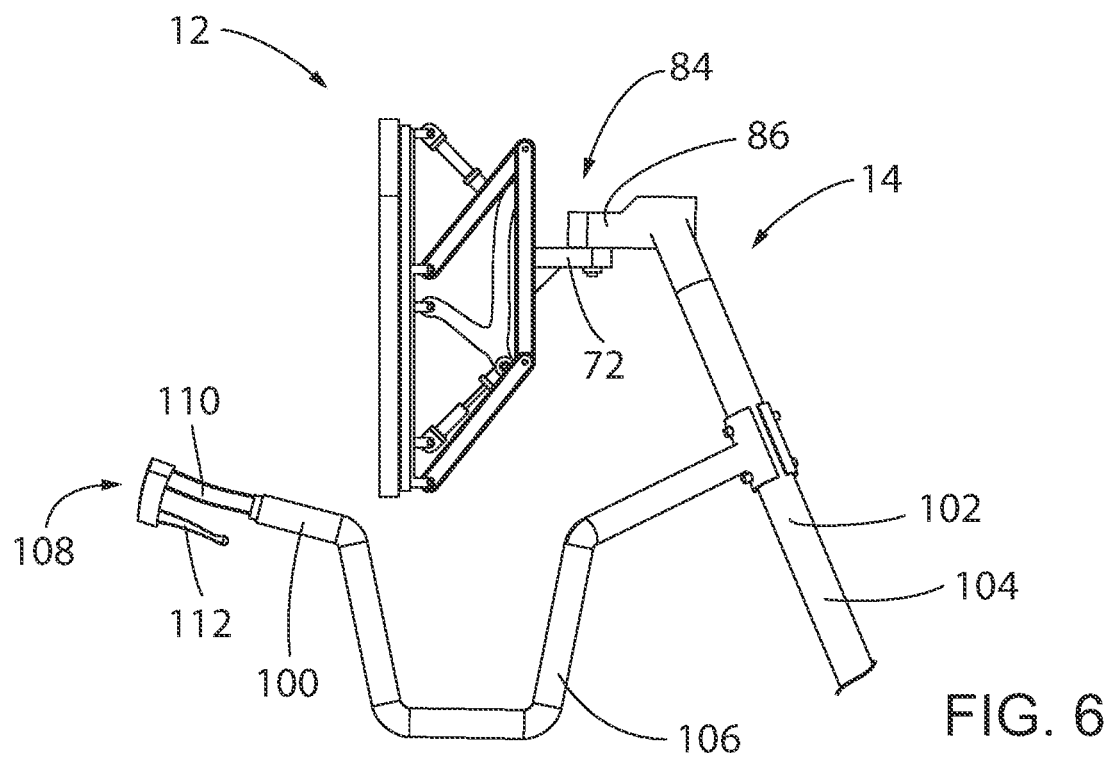
FIG. 6 is a side elevation view of a front portion of the wheel pack assembly of FIG. 1 in a forward directed tilted position.
Figure 7:
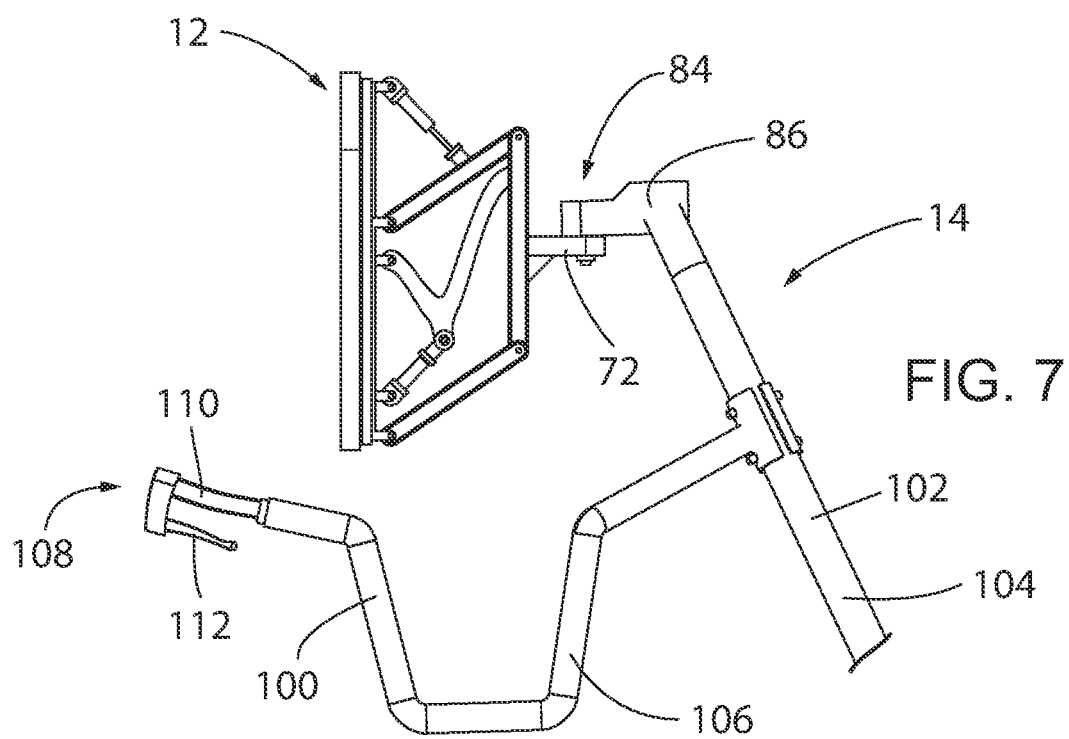
FIG. 7 is a side elevation view of the front portion of the wheel pack assembly of FIG. 1 in a rearward directed tilted position.

FIGS. 6 and 7 further illustrate handle bars 100 extending from a forward shaft 102 of a frame 104 of the wheeled portion 14. The frame 104 may comprise hollow tubes to reduce the weight of the wheeled portion 14. The handle bars 100 extend forward from the forward shaft 102 of the frame 104 and toward respective sides of the user 18, as shown in FIG. 1. As such, the handle bars 100 include a left handle bar 100a extending to a left side of the user 18 and a right handle bar 100b extending to a right side of the user 18. Each handle bar 100 includes a dipped portion 106 extending downward, the benefits of which will be described later. Further, each handle bar 100 includes a distal end 108, which may have a hand grip 110 and a lever 112. In one embodiment of the invention, the lever 112a left handle bar 110a may be a hand brake to assist in controlling the speed of the assembly 10, while the lever 112b of the second handle bar 110b may be used to transition the locking mechanism 90 between the locked and unlocked positions 96, 98. In other embodiments of the invention, the levers 112a, 112b may be switched. In yet other embodiments of the invention, one of the left and right handle bar 110a may include one or more levers 112, while the other includes no levers 112. Whether provided for left hand or right hand operational orientation, it is appreciated that operation of a braking assembly that is operatively associated with a respective brake lever is operable to provide greater resistance to the travel of assembly 10 relative to ground surfaces. Such considerations mitigate potential of the user succumbing to the translational forces associated with use of assembly 10 and attributable to conditions of the terrain; such as grade, moisture, or footing; and/or the mass and evenness of the load being transported.

The dipped portion 106 is configured to act as a stand for the wheeled portion 14. That is, upon removal of the wheeled portion 14 from the pack portion 12, a user 18 is able to set wheeled portion 14 on the ground. The dipped portion 106 extends toward the ground in order to space the hand grips 110 from the ground. This allows a user 18 to easily grab the hand grips 110 in order to resume use without bending all the way to the ground.

Referring now to FIG. 10, the wheeled portion 14 of the assembly 10 is shown separate from the pack portion 12. As mentioned above, the wheeled portion 14 includes a frame 104. The frame 104 extends from the forward end 84 of the wheeled portion 14 to a rear end 114 of the wheeled portion 14. The frame 104 includes a first, lateral portion 116 extending from the rear end 114 to a bend location 118. The frame 104 may also include a second, angled portion 120 extending from the bend location 118 to the forward end 84 and forming the above-mentioned forward shaft 102 of the frame 104. In the representative embodiment of the invention, the angled portion 120 extends upward at an angle from lateral portion 116 at the bend location 118. It is contemplated that the angled portion 120 may extend from the lateral portion 116 at any angle between 0° and 180° and, more preferably, any angle between 90° and 180°.

As shown in FIG. 10, the frame 104 includes a left portion 104a and a right portion 104b. While the left and right portions 104a, 104b are depicted as merging at the coupler 86 and the rear end 114, it is contemplated that the left and right portions 104a, 104b of the frame 104 may join together at a variety of locations between the forward and rear ends 84, 114 of the wheeled portion 14. In addition, at least one crossbar 121 may extend between the left and right portions 104a, 104b of the frame 104 to provide additional rigidity and mitigate twisting or racking of the frame 104. The representative embodiment of the invention, depicts a crossbar 121 extending between the left and right portions 104a, 104b of the frame at the bend location 118. However, other embodiments of the invention may include one or more crossbars 121 at various locations along the frame 104.

The wheeled portion 14 may also include a bed 122 extending along the lateral portion 116 of the frame 104. In the representative embodiment of the invention, the bed 122 includes a number of straps extending from the left portion 104a of the frame 104 to the right portion 104b of the frame. The straps provide a bed 122 upon which a load 124 may be placed and/or otherwise supported or secured. In other embodiments of the invention, the bed 122 may be a single piece of fabric extending between the left and right portions 104b of the frame from all of or a portion of the distance between the rear end 114 and the bend portion 118.

A wheel set 126 may be coupled to the frame 104, so as to allow the wheeled portion 14, and the assembly 10 as a whole, to roll over a ground surface 128. As shown in FIGS. 1 and 10, the wheel set 126 is disposed along the lateral portion 118 of the frame 104 at a location 130 that preferably provides a balanced configuration of assembly 10 relative to the user. More preferably, location 130 and the load associated with assembly 10 only slightly loads toward the forward facing portion of assembly 10 such that the same preferably neither overloads the user nor produces an appreciable upwardly directed force associated with the ball and hitch engagement. Understandably, such loading will depend largely on the weigh associated with discrete loads and placement of the same relative to location 130. In the representative embodiment of the invention, the location 130 is between and spaced apart from the bend 118 and the rear end 114 of the wheeled portion 14. As a result, the weight of the load 124 is better centered over the wheel set 126 to reduce stress on the user 18. As shown in FIG. 1, the wheel set 126 may be coupled to the frame 104 via a wheel bar 132. The wheel bar 132 extends from the lateral portion 114 of the frame 114 to the previously discussed location 130. While FIG. 1 shows the wheel bar 132 as being coupled to the frame 104 at a location adjacent the bend 118, it is contemplated that the wheel bar 132 may be coupled to the frame 104 at any location.

In addition, the wheeled portion 14 may include a secondary wheel set 134 disposed forward of the wheel set 126. The secondary wheel set 134 is coupled to the frame 104 and sized smaller than the wheel set 126. The secondary wheel set 134 is configured to mitigate damage to frame 104 of assembly 14 should it engage an obstacle, such as a rock, tree trunk, or the like, during use. Additionally, the wheeled portion 14 may also include a tertiary wheel set 136 disposed rearward of the wheel set 126. The tertiary wheel set 136 is located beyond the rear end 114 and configured to engage an obstacle to prevent the obstacle from damaging the rear end 114. As shown in FIG. 1, the tertiary wheel set 136 may be coupled to the first wheel set 126 by a support bar 138. In other embodiments of the invention, the support bar 138 may alternatively couple the tertiary wheel set 136 to the laterally oriented portion 116 of the frame 104. The support bar 138 may be configured to have a requisite stiffness to assist in slowly and smoothly lowering the wheeled portion 14 from a higher elevation to a lower elevation over an obstacle.

Further yet, a stabilizing element 140 may be coupled to the wheel set 126 to provide stabilization for the load 124 during transportation. The stabilizing element 140 may be in the form of a shock absorber, a spring, or the like extending between the frame 104 and an axle 127 of the wheel set 126. The combination of stabilizing elements 78, 140 and articulating arms 38 provide for a smooth transition of the wheeled portion 14 across variable or uneven terrain 128 and/or obstacles. As stated above, the ability of the articulating arms 38 and hinge plate 40 to rotate about horizontal axis 54, 56, 60, 70, allows the wheeled portion 14 to transition with the variable terrain 128 without providing additional stress on the pack portion 12 and thereby the user 18. That is, the wheeled portion 14 and elements of the frame support 34 are able to transition with the variable terrain 128 without causing movement of the back support 20 of the pack portion 12.

It is contemplated that in at least one embodiment of the invention, the wheeled portion 14 of the assembly 10 may include a power assist motor and power braking. In such an instance, the ball 88 may include a forward sensor and a rear sensor. The forward sensor is disposed on a forward side of the ball 88 and configured to sense when the coupler 86 is pulling on the ball 88. Upon such an indication, the power assist motor may provide power to the wheel set 128 and assist the user 18 in moving forward. The rear sensor is disposed on a rear side of the ball 88 and configured to sense when the coupler 86 is pushing on the ball 88. Upon such an indication, the power braking may provide brake assistance to assist the user 18 in slowing down. It is contemplated that such systems may be powered by a battery, such as a rechargeable battery. Further, the assembly 10 may include a solar panel to charge the battery. It is further appreciated that the relative forward and rearward indicating sensors could alternatively be positioned rearward or forward of ball 88. It is further appreciated that the functionality associated with the respective sensors could be provided by a single sensor having a neutral configuration, i.e. neither braking or driving, disposed between a range of operation of the respective sensor.

In yet another embodiment of the invention, the frame 104 of the wheeled portion 14 may be comprised to be easily collapsible to reduce the size of the assembly 10 for transportation. For example, the wheeled portion 14 may be foldable at the bend 118 of the frame 104. In addition, the handlebars 100 may be removable or foldable back on to the frame 104. An embodiment of the invention depicting the collapsibility of the assembly 10 is disclosed further below with respect to the orientation shown in FIGS. 11 and 12.

Figure 11:
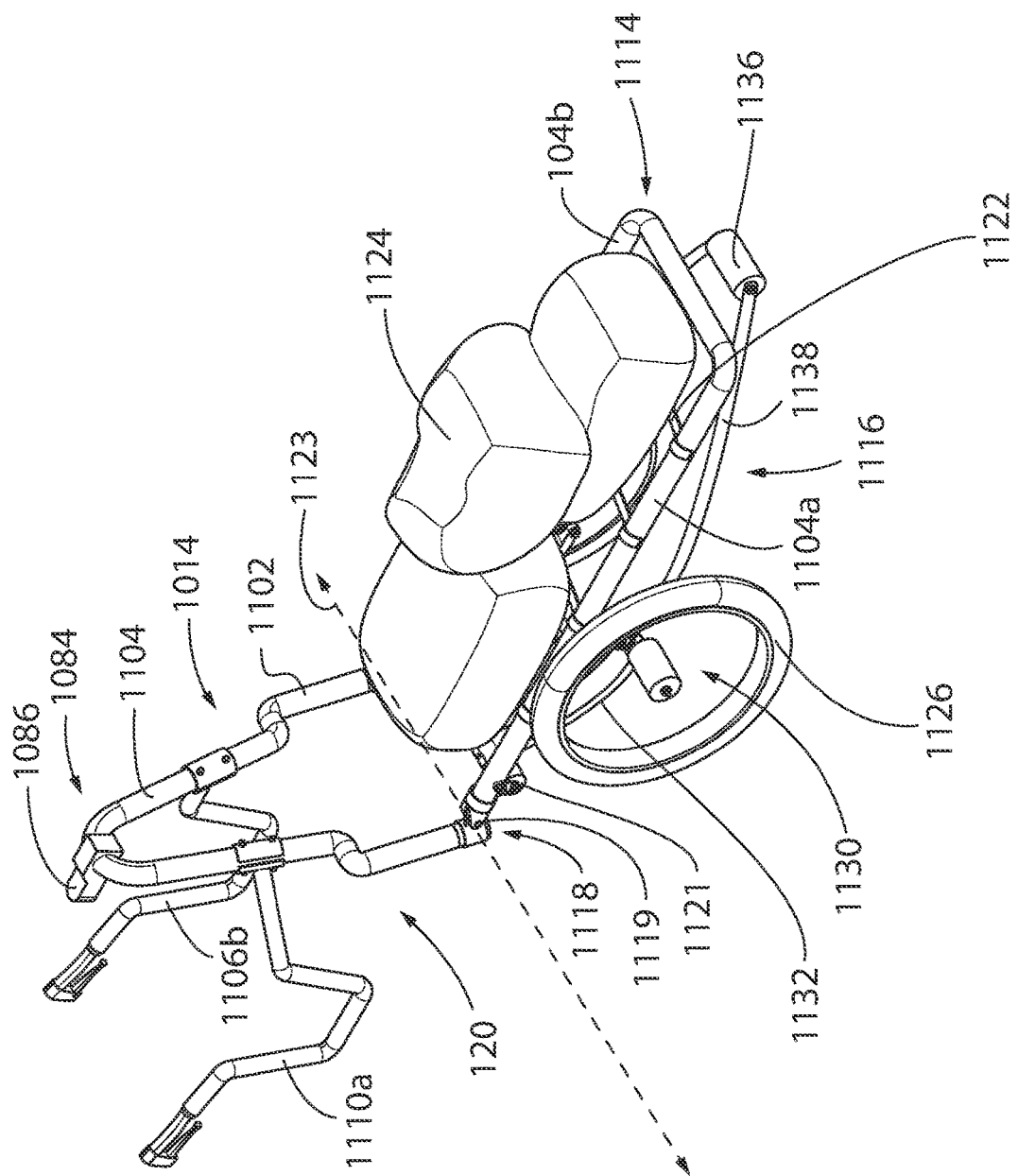
FIG. 11 is a perspective view of a wheeled portion of a wheel pack assembly according to another embodiment of the present invention.
Figure 12:
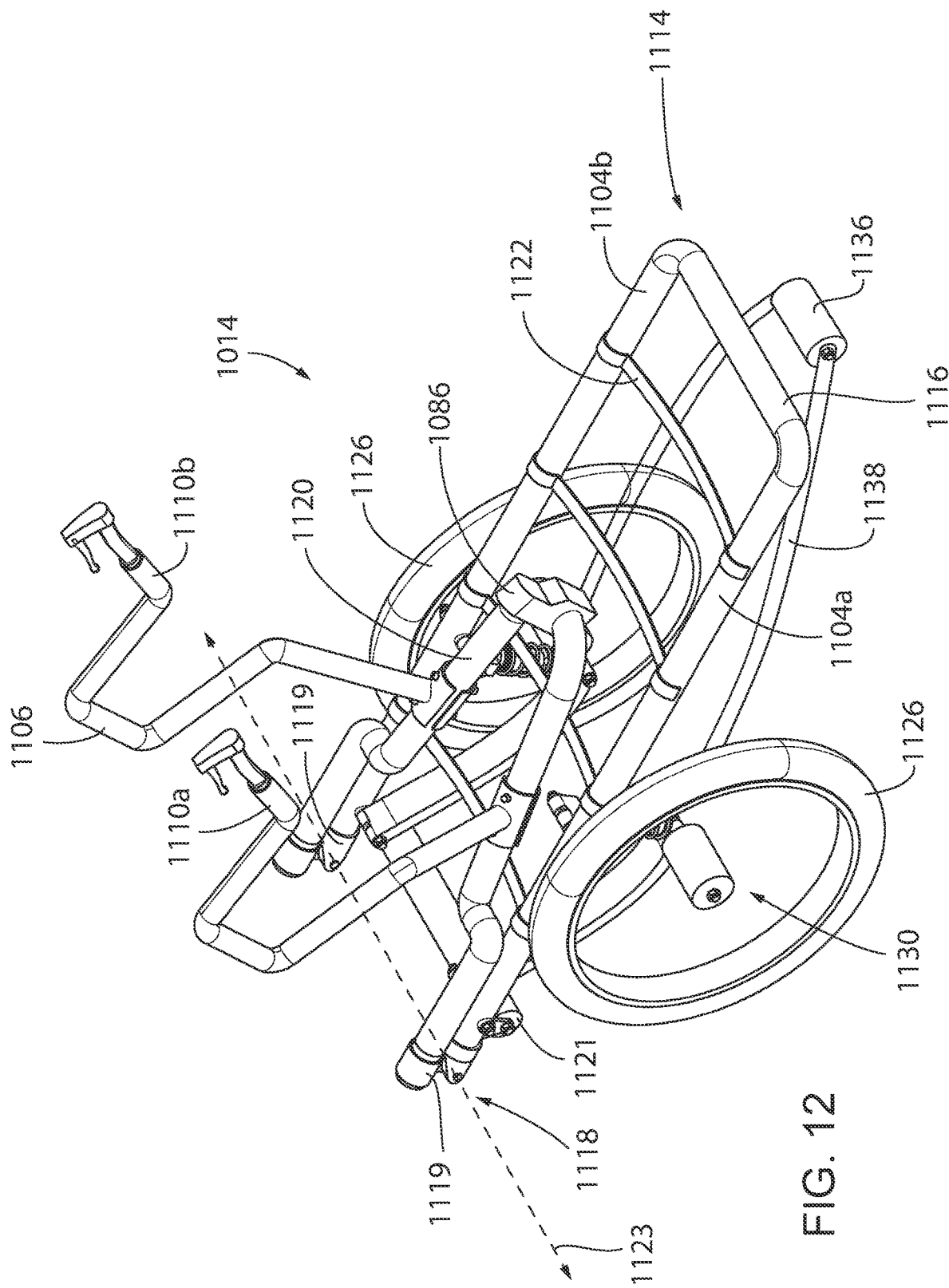
FIG. 12 is a perspective view of the wheeled portion of FIG. 11 shown in a stowed or storage orientation.

FIGS. 11 and 12 depict such a collapsible wheeled portion 1014. The wheeled portion 1014 is constructed mostly similar to the wheeled portion 14 shown in FIGS. 1-10, as reflected by the numbering similarities between the respective figures. In FIGS. 11 and 12, a hinge 1119 is disposed at each bend 118 of the frame 1104 in order to allow the frame 1104 to be collapsible and reduce the size of the wheeled portion 1014 during storage and transportation.

The hinge 1119 divides the frame 1104 into a first portion 1120 and a second portion 1116, which are able to pivot about a pivot axis 1123. The pivot axis 1123 extends between each of the hinges 1119 that transverse the frame 1104. In turn, the first portion 1120 and the second portion 1116 of the frame 1104 are able to pivot with respect to each other about the pivot axis 1123. While the representative embodiment of the invention illustrates the use of two (2) hinges 1119, alternative embodiments of the invention may use any number of hinges 1119 disposed along the pivot axis 1123.

FIG. 11 depicts the frame 1104 in a use or an operation orientation. In the operation orientation, the first portion 1120 of the frame 1104 extends upward at an angle from second portion 1116 at the hinge 1119. It is contemplated that the angle may any angle between 0° and 180° and, more preferably, any angle between 90° and 180°. Meanwhile, FIG. 12 depicts the frame 1104 in a stowed or storage orientation. In the storage orientation, the first portion 1120 of the frame 1104 is folded toward the second portion 1116 about the pivot axis 1123. As shown, the first portion 1120 is preferably folded about the pivot axis 1123 to be virtually parallel to the second portion 1116. In varying embodiments of the invention, the first portion 1120 may be oriented at an angle between 0° and 45° with respect to the second portion 1116 and, more particularly at an angle between 0° and 15°.

Figure 13:
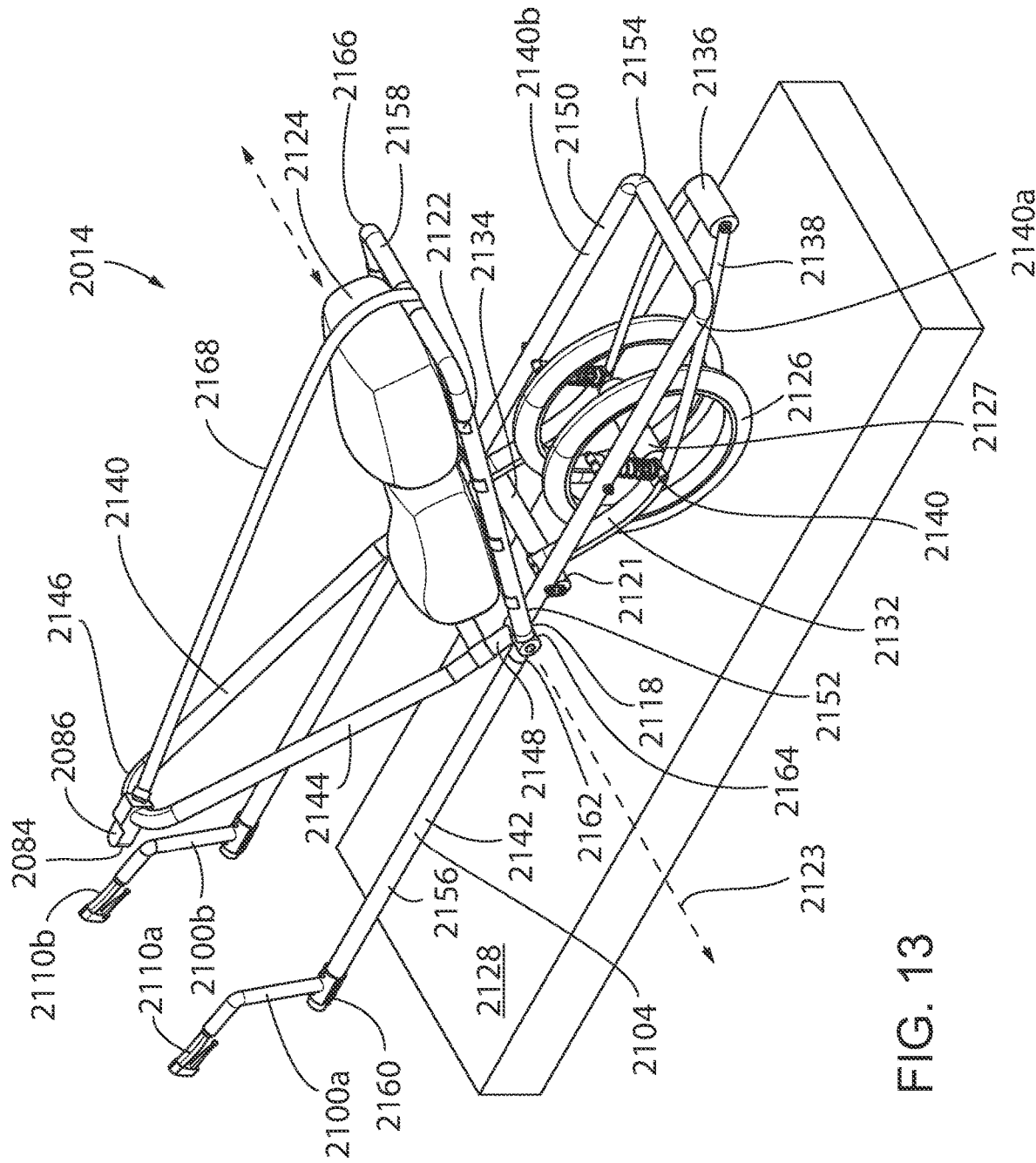
FIG. 13 is a perspective view of a wheeled portion of a wheel pack assembly according to yet another embodiment of the present invention.
Figure 14:
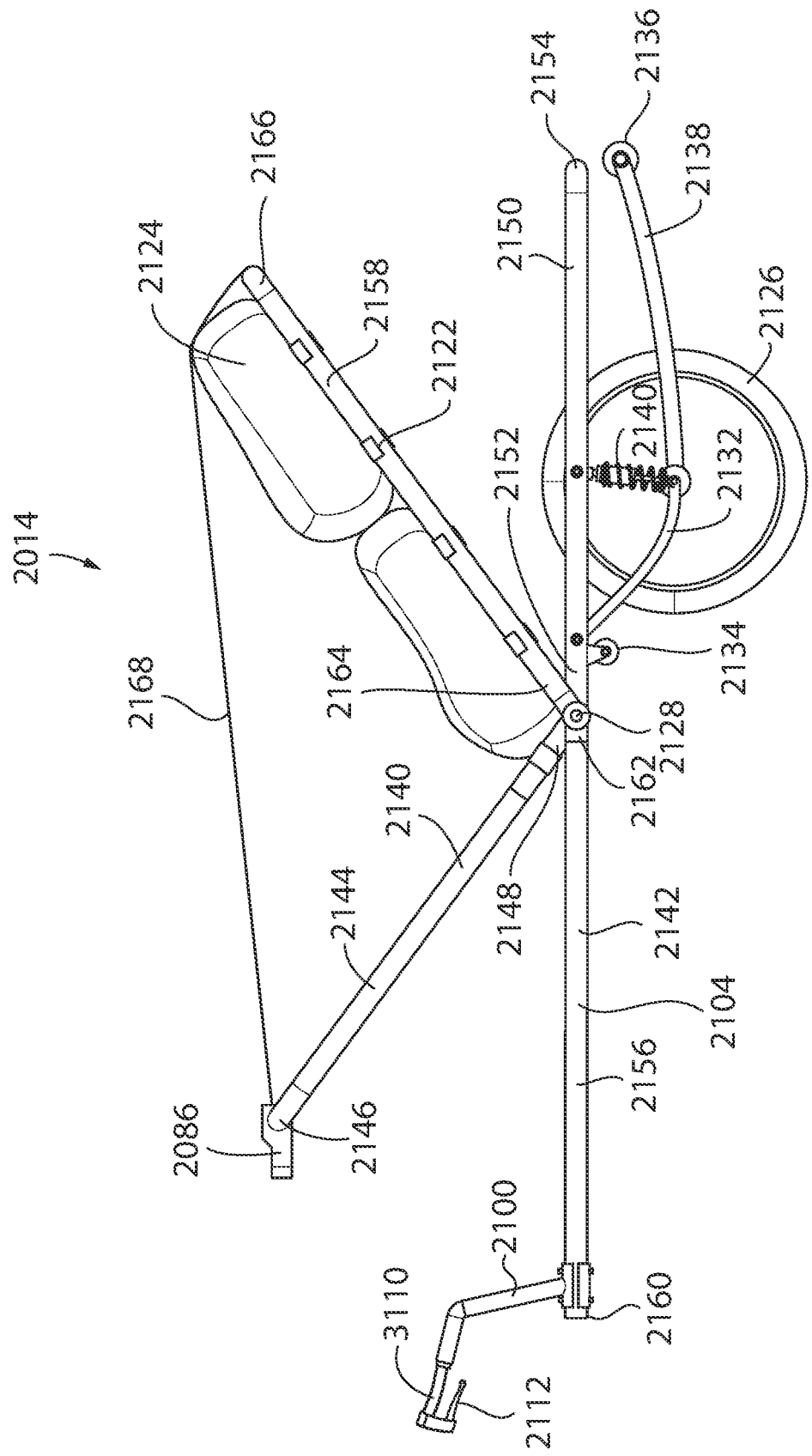
FIG. 14 is a side elevation view of the wheeled portion of FIG. 13 in an operation orientation.
Figure 15:
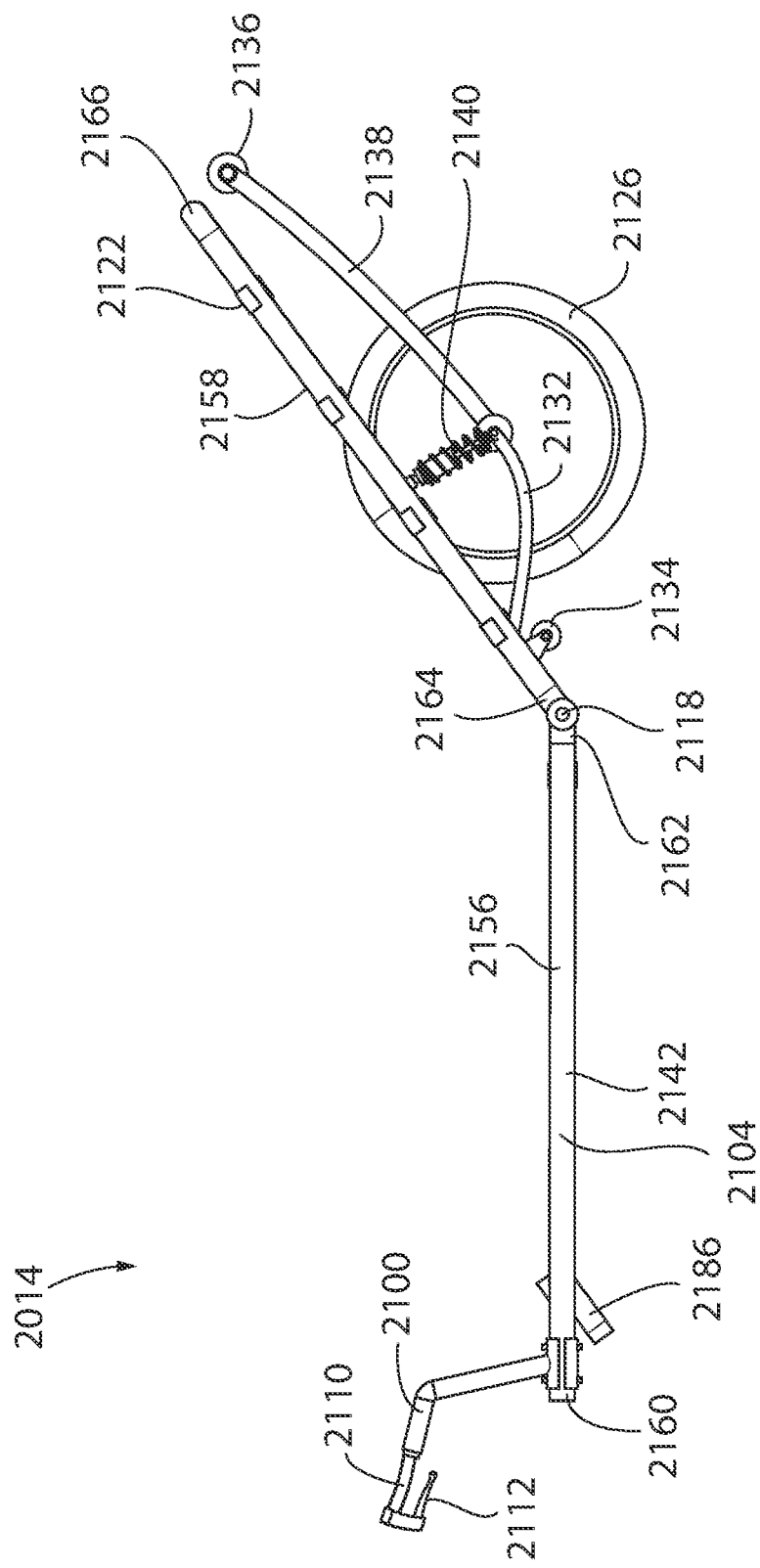
FIG. 15 is a side elevation view of the wheeled portion of FIG. 13 in a storage orientation.

Now referring to FIGS. 13-15, another embodiment of a wheeled portion 2014 of an assembly 2010 is shown. Similar to the previously described wheeled portions, the wheeled portion 2014 of FIGS. 13-15 includes a coupler 2086 disposed at a forward end 2084 of the wheeled portion 2014. The coupler 2086 is configured to interfit with the previously described hitch 72 to removably couple the wheeled portion 2014 to the pack portion 12.

The wheeled portion 2014 includes a frame 2104 divided into a first frame portion 2140 and a second frame portion 2142 that are pivotably connected to each other at at least one point along a pivot axis 2123. The first and second frame portions 2140, 2142 are configured to pivot with respect to each other about the pivot axis 2123 to transition between an operation orientation (FIGS. 13 and 14) and a storage orientation (FIG. 15). As previously mentioned, the frame 2104 may comprise hollow tubes to reduce the weight of the wheeled portion 2014. The first frame portion 2140 includes a first leg 2144 extending from a first end 2146 to a second end 2148 disposed at the pivot axis 2123. In the operation orientation shown in FIGS. 13 and 14, the first leg 2144 extends from the pivot axis 2123 upward and forward at an angle. The previously described coupler 2086 is coupled to the first end 2146 of the first leg 2144. The first frame portion 2140 also includes a second leg 2150 extend from a first end 2152 at the pivot axis 2123 to a second end 2154. In the operation orientation shown in FIGS. 13 and 14, the second leg 2150 extends rearward from the pivot axis 2123 generally parallel to the ground surface 2128. In the representative embodiment of the invention, the first frame portion 2140 transitions from the first leg 2144 to the second leg 2150 at a bend location 2118 disposed at the pivot axis 2123. In other embodiments of the invention, the first and second legs 2144, 2150 may be separate elements joined together at the bend location 2118 and pivot axis 2123. It is contemplated that the first frame portion 2140 may extend from the second leg portion 2150 at any angle between 0° and 180°, preferably, any angle between 90° and 180°.

As shown, the first frame portion 2140 includes a left portion 2140a and a right portion 2140b. In the representative embodiment of the invention, the left and right portions 2140a, 2140b are depicted as merging at the coupler 2086 and the second end 2154. In other embodiments of the invention, it is contemplated that the left and right portions 2140a, 2140b of the frame 2104 may join together at a variety of locations between the coupler 2084 and the second end 2154 of the second leg 2150. The first frame portion 2140 may also include at least one crossbar 2121 extending between the left and right portions 2140a, 2140b of the first frame portion 2140 to provide additional rigidity and mitigate twisting or racking of the first frame portion 2140. The representative embodiment of the invention depicts a crossbar 2121 extending between the left and right portions 21400a, 2140b at a location along the second leg 2150 adjacent to the bend location 2118. However, other embodiments of the invention may include one or more crossbars 2121 at various locations along the first frame portion 2140.

In addition, a wheel set 126 is coupled to the first frame portion 2140. As shown in FIGS. 13-15, the wheel set 126 is disposed along the second leg 2150 of the first frame portion 2140 at a location between the first and second ends 2152, 2154 of the second leg 2150. As shown, the wheel set 2126 may be coupled to the frame first frame portion 2140 by way of a wheel bar 2132, which extends from the second leg 2150 of the first frame portion 2140 to the previously discussed location 2130. In the representative embodiment of the invention, the wheel bar 2132 extends from the crossbar 2121. In varying embodiments of the invention, the wheel bar 2132 may be coupled to the second leg 2150 of the first frame portion 2140 at any location. FIGS. 13-15 depict the wheel set 126 as being disposed between the left and right portions 2140a, 2140b. Disposing the wheel set 2126 between the left and right portions 2140a, 2140b, renders the wheeled portion 2014 able to transition between the operation orientation and the storage orientation without the wheel set 2126 interfering with the movement of the frame portions 2140, 2142.

The wheeled portion 2014 may also include a secondary wheel set 2134 disposed forward of the wheel set 2126. The secondary wheel set 2134 is coupled to the frame 2104, sized smaller than the primary wheel set 2126, and is configured to mitigate damage to frame 2104 of wheeled portion 2104 should it engage an obstacle, such as a rock, tree trunk, or the like, during use. In the representative embodiment of the invention, the secondary wheel set 2134 is disposed at the same location as the crossbar 2121. In other embodiments of the invention, the secondary wheel set 2134 and the crossbar 2121 may be disposed at different locations along the length of the second leg 2150 of the first frame portion 2140.

Further, the wheeled portion 2014 may include a tertiary wheel set 2136 disposed rearward of the primary wheel set 2126. The tertiary wheel set 2136 is located beyond the second end 2154 of the second leg 2150 and configured to engage an obstacle to prevent the obstacle from damaging a rear end 2114 of the wheeled portion 2014 and so as to guide the assembly thereabout. As shown in FIG. 13, the tertiary wheel set 2136 is coupled to the first wheel set 2126 by a support bar 2138. In other embodiments of the invention, the support bar 2138 may alternatively couple the tertiary wheel set 2136 to the first frame portion 2140. It is contemplated that the support bar 2138 may be configured to have a requisite stiffness to assist in slowly and smoothly lowering the wheeled portion 2014 from a higher elevation to a lower elevation over an obstacle.

Further yet, a stabilizing element 2141 may be coupled to the primary wheel set 2126 to provide stabilization for the wheeled portion 2014 and the load 2124 thereon during transportation across variable or uneven terrain 128 and/or obstacles. The stabilizing element 2141 may be in the form of a shock absorber, a spring, or the like extending between the first frame portion 2140 and an axle 2127 of the primary wheel set 2126.

Similar to the first frame portion 2140, the second frame portion 2142 includes a first leg 2156 and a second leg 2158. The first leg 2156 extends from a first end 2160 to a second end 2162 disposed at the pivot axis 2123. In the operation orientation, the first leg 2156 extends forward from the pivot axis 2123 generally parallel to the ground surface 2128. Similarly, the second leg 2158 extends from a first end 2164 disposed at the pivot axis 2123 to a second end 2166. In the operation orientation, the second leg 2158 extends from the pivot axis 2164 upward and rearward at an angle. In the representative embodiment of the invention, the second frame portion 2142 transitions from the first leg 2156 to the second leg 2158 at the bend location 2118, which is aligned with the pivot axis 2123. In other embodiments of the invention, the first and second legs 2156, 2158 may be separate elements joined together at the bend location 2118 and pivot axis 2123. It is contemplated that the second leg 2158 may extend from the first leg 2156 at any angle between 0° and 180°, preferably, any angle between 90° and 180°. In the representative embodiment of the invention, the angle at which the second leg 2158 extends from the first leg 2156 is the same as the angle at which the first leg 2144 extends from the second leg 2150. However, these angles may be the same or different in varying embodiments of the invention and/or provided in an adjustable form factor to satisfy discrete user preferences.

Similar to the first frame portion 2140, the second frame portion 2142 includes a left portion 2142a and a right portion 2142b. In the representative embodiment of the invention, the left and right portions 2142a, 2142b are depicted as merging at the second end 2166 of the second leg 2158 and remaining spaced apart at the first end 2160 of the first leg 2156. In other embodiments of the invention, it is contemplated that the left and right portions 2142a, 2142b may join together at a variety of locations along the length of the first and second legs 2156, 2158.

The second frame portion 2142 of the wheeled portion 2014 also includes a bed 2122 extending along the second leg 2158. In the representative embodiment of the invention, the bed 2122 includes a number of straps extending between the left portion 2142a to the right portion 2142b along the length of the second leg 2158. The straps provide a bed 2122 upon which the load 2124 may be laid. In addition, the first leg 2144 of the first frame portion 2140 may also include straps extending between the left and right portions 2140a, 2140b at a location adjacent the second end 2148 of the first leg 2144 to expand the bed 2122 of the wheeled portion 2014.

In other embodiments of the invention, the bed 2122 may be a single piece of fabric extending between the left and right portions 2142a, 2142b for all of or a portion of the length of the second leg 2158. Further yet, the bed 2122 may include a piece of fabric extending between left and right portions 2140a, 2140b for a portion of the first leg 2140 of the first frame portion 2140 to expand the bed 2122.

The wheeled portion 2014 may also include handle bars 2100 coupled to the first leg 2156 of the second frame portion 2142. In the representative embodiment of the invention, the handle bars 2100 are disposed at or adjacent the first end 2160 of the first leg 2156. In other embodiments of the invention, the handle bars 2100 may be disposed at any location along the length of the first leg 2156. The handle bars 2100 include a left handle bar 2100a and a right handle bar 2100b disposed on either side of the user. Each handle bar 2100 includes a hand grip 2110 and preferably a lever 2112. In one embodiment of the invention, the lever 2112a associated with left handle bar 2110a may be a hand brake to assist in controlling the speed of travel of the underlying assembly, while the lever 2112b of the second handle bar 2110b may be used to transition the locking mechanism 90 between the locked and unlocked positions 96, 98. In other embodiments of the invention, the levers 2112a, 2112b may be switched. In yet other embodiments of the invention, one of the left and right handle bar 2110a may include one or more levers 2112, while the other includes no levers 2112.

FIGS. 13 and 14 further illustrate the use of a strap 2168 extending from the first end 2146 of the first leg 2144 of the first frame portion 2140 to the second end 2166 of the second leg 2158 of the second frame portion 2142. The strap 2158 is able to be removably coupled from one or both of the above-mentioned first end 2146 and second end 2166. In turn, the strap 2158 is able to distribute weight between the second frame portion 2142, which is felt by the user on the handle bars 2100, and the first frame portion 2140, which is felt by the user on the pack portion 12.

Referring now to FIG. 15, the wheeled portion 2014 is shown in the storage orientation, which reduces the overall space required to storage or transport the wheeled portion 2014 in a non-use configuration. In the storage orientation, the first and second frame portions 2140, 2142 are pivoted with respect to each other about the pivot axis 2123 so that the second legs 2150, 2158 are oriented parallel or generally parallel to each other, while the first legs 2144, 2156 are oriented parallel or generally parallel to each other. In the representative embodiment of the invention, the width of the first frame portion 2140 is less than the width of the second frame portion 2142 so that the first legs 2144, 2156 are along a similar plane, while the second legs 2150, 2158 are also oriented along their own similar plane. However, in other embodiments of the invention, it is contemplated that the width of the first frame portion 2140 may be greater than the width of the second frame portion 2142.

Further yet, while FIGS. 13-15 depict the wheel set 2126 as being disposed between the left and right portions 2140a, 2140b, other embodiments of the invention may have the wheel set 2126 disposed outside of the left and right portions 2140a, 2140. In turn, while FIGS. 13-15 depict the width of the second leg 2150 of the first frame portion 2140 as being less than the width of the second leg 2158 of the second frame portion 2142, other embodiments of the invention may have the width of the of the second leg 2150 of the first frame portion 2140 being greater than the width of the second leg 2158 of the second frame portion 2142.

It should be understood that the above description, while indicating representative embodiments of the present invention, is given by way of illustration and not of limitation. Many changes and modifications may be made within the scope of the present invention without departing from the spirit thereof, and the invention includes all such modifications. Various additions, modifications, and rearrangements are contemplated as being within the scope of the following claims, which particularly point out and distinctly claim the subject matter regarding as the invention, and it is intended that the following claims cover all such additions, modifications, and rearrangements.

I claim:

1. A wheel pack assembly comprising:
   a pack portion wearable by a user, the pack portion including a support frame having at least one articulating arm, at least one stabilizing element, and a hitch; and
   a wheeled portion removably coupled to the pack portion, the wheeled portion including:
      a frame having a first frame portion and a second frame portion joined together at a bend, wherein the first frame portion is pivotably coupled to the second frame portion at the bend about a pivot axis;
      a coupler coupled to the frame and removably coupled with the hitch; and
      a primary wheel set coupled to the frame and disposed at a location spaced apart from a rear end of the wheeled portion;
   wherein the first frame portion of the wheeled portion includes a first leg extending forward from the bend and a second leg extending rearward from the bend; and
   wherein the second frame portion of the wheeled portion includes a first leg extending forward from the bend and a second leg extending rearward from the bend.

2. The wheel pack assembly of claim 1 wherein the coupler includes a locking mechanism having a locked position and an unlocked position;
   wherein the hitch and coupler are removable from each other in the unlocked position; and
   wherein the hitch and coupler are not removable from each other in the locked position.

3. The wheel pack assembly of claim 1 wherein the at least one articulating arm of the support frame transitions the hitch in response to movement of the wheeled portion; and
   wherein the stabilizing elements of the support frame maintain the hitch in a neutral position.

4. The wheel pack assembly of claim 1 wherein the first and second portions of the frame pivot with respect to each other about the pivot axis to transition the wheeled portion between an operation orientation and a storage orientation;
   wherein the first leg of the first frame portion extends from the pivot axis upward and forward at an angle when in the operation orientation;
   wherein the second leg of the first frame portion extends from the pivot axis rearward when in the operation orientation;
   wherein the first leg of the second frame portion extends from the pivot axis forward when in the operation orientation; and
   wherein the second leg of the second frame portion extends from the pivot axis upward and rearward at an angle when in the operation orientation.

5. The wheel pack assembly of claim 1 wherein the first and second portions of the frame pivot with respect to each other about the pivot axis to transition the wheeled portion between an operation orientation and a storage orientation;
   wherein the first leg of the first frame portion and the first leg of the second frame portion are oriented along the same plane when in the storage orientation; and
   wherein the second leg of the first frame portion and the second leg of the second frame portion are oriented along the same plane when in the storage orientation.

6. The wheel pack assembly of claim 1 further comprising handlebars disposed at a distal end of the first leg of the second frame portion and a bed disposed along a length of the second leg of the second frame portion.

7. The wheel pack assembly of claim 1 wherein the primary wheel set is coupled to the second leg of the first portion of the frame.

8. The wheel pack assembly of claim 7 further comprising a secondary wheel disposed forward of the primary wheel set and a tertiary wheel disposed rearward of the primary wheel set.

* * * * *